United States Patent [19]
Mutton et al.

[11] 4,144,576
[45] Mar. 13, 1979

[54] DEVICES FOR MEASURING PLANAR AREA WITHIN A CLOSED CURVED PATH

[75] Inventors: David E. Mutton, Bromley; Edward G. C. A. Boyd, Purley, both of England

[73] Assignee: National Research Development Corporation, London, England

[21] Appl. No.: 755,569

[22] Filed: Dec. 29, 1976

[30] Foreign Application Priority Data

Jan. 7, 1976 [GB] United Kingdom .............. 00513/76

[51] Int. Cl.² .......................................... G06F 15/20
[52] U.S. Cl. .................................... 364/564; 33/123; 235/92 DN; 364/562
[58] Field of Search .......... 235/151.32, 151.3, 92 DN, 235/92 MP, 92 MT, 92 V; 340/146.3 AE; 33/1 C, 125 C, 141 E, 125 R, 121-124; 364/562, 560, 561, 564, 818

[56] References Cited

U.S. PATENT DOCUMENTS

| | | | |
|---|---|---|---|
| 2,850,239 | 9/1958 | Polanyi et al. | 235/92 DN |
| 3,172,598 | 3/1965 | Carson et al. | 235/92 DN |
| 3,261,967 | 7/1966 | Rosin et al. | 235/92 DN |
| 3,811,648 | 5/1974 | Ream, Jr. et al. | 235/92 V |
| 3,870,871 | 3/1975 | Nead | 364/818 |
| 4,009,377 | 2/1977 | Elms | 235/151.32 |
| 4,019,173 | 4/1977 | Kono | 340/146.3 |

OTHER PUBLICATIONS

Wilson, E. B.; Advanced Calculus; — The Atheneum Press—Ginn and Company, 1912, pp. 68-70, 78-81, 311-313.

*Primary Examiner*—Charles E. Atkinson
*Assistant Examiner*—Errol A. Krass
*Attorney, Agent, or Firm*—Cushman, Darby & Cushman

[57] ABSTRACT

A device for measuring the movement of a movable means along a curved path comprises measuring means arranged to measure the movement of the movable means in terms of a series of increments corresponding to chords to the curved path of equal length, and counting means arranged to count the number of said increments. The movement may be in two or three dimensions. When the curved path is a two dimensional closed path, the area enclosed by the path can be measured.

2 Claims, 5 Drawing Figures

DEVICES FOR MEASURING PLANAR AREA WITHIN A CLOSED CURVED PATH

This invention relates to devices for measuring the length of a curved path.

In map reading, whether directly or when a map is displayed, for example, on a radar screen, it is frequently necessary to measure the length of a curved path. Similarly, in microscopy, the total length of a sinuous specimen such as chromosome may be required. The problem may also arise in planning, building and the interpretation of photographic records, etc.

Previous methods of measurement include mechanical devices such as a map measuring wheel, acoustic devices using spark discharges along the path and having microphones arranged along two axes, and electromechanical x-y plotters using arrangements of pulleys and potentiometers. Such methods may be subject to considerable errors.

According to the invention, a device for measuring the movement of a movable means along a curved path comprises means for measuring the movement of the movable means in terms of a series of increments corresponding to chords to the curved path of equal length, and means for counting the number of said increments.

Said means for measuring the movement of the movable means in terms of a series of equal chords may, for example, comprise means repeatedly operative to count equal displacements of the movable means along each of two or three orthogonal directions, means for squaring the number of displacements in each direction, and means for summing the squares associated with said two or three orthogonal directions until a sum corresponding to the required increment is reached.

In one embodiment of the invention, suitable for measuring the length of a two-dimensional curved path, the device comprises an optical instrument, such as a microscope, having a movable specimen stage, a position indicator, and drive means for driving the movable stage in a curved path relative to the position indicator. In one arrangement the specimen stage is a stepping stage drivable in two orthogonal directions by two signals each in the form of a pulse train; each pulse corresponds to a unit displacement in the associated direction.

A device according to the invention may also be used to measure the area enclosed by a planar closed path, by further providing means to locate each increment with respect to two orthogonal directions in the plane, means to determine each of the areas between an increment and one orthogonal direction, each area having associated with it an arithmetical sign related to the general direction of movement of the movable means along said one orthogonal direction during production of that increment; and means to determine the modulus of the arithmetical sum of the areas.

One embodiment of the invention will now be described by way of example with reference to the accompanying drawings in which.

Figure 1:
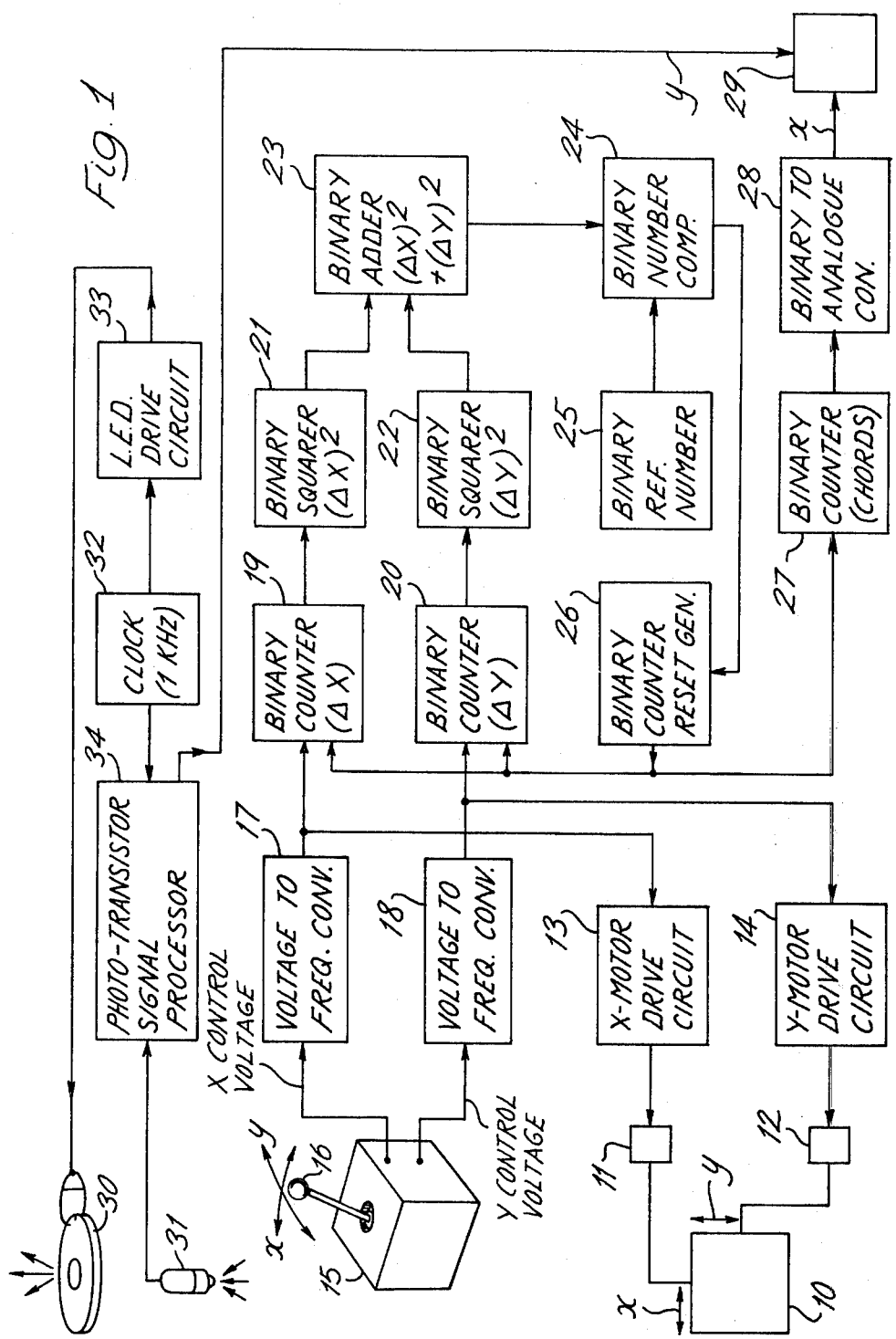
FIG. 1 illustrates schematically an electrical control and measuring system according to the invention used to operate the stepping stage of a microscope.

In FIG. 1, the motorised stepping stage 10 of a microscope is movable in two orthogonal directions x,y, by means of X and Y drive motors 11 and 12 respectively, operated by X and Y drive circuits 13 and 14.

Figure 2:
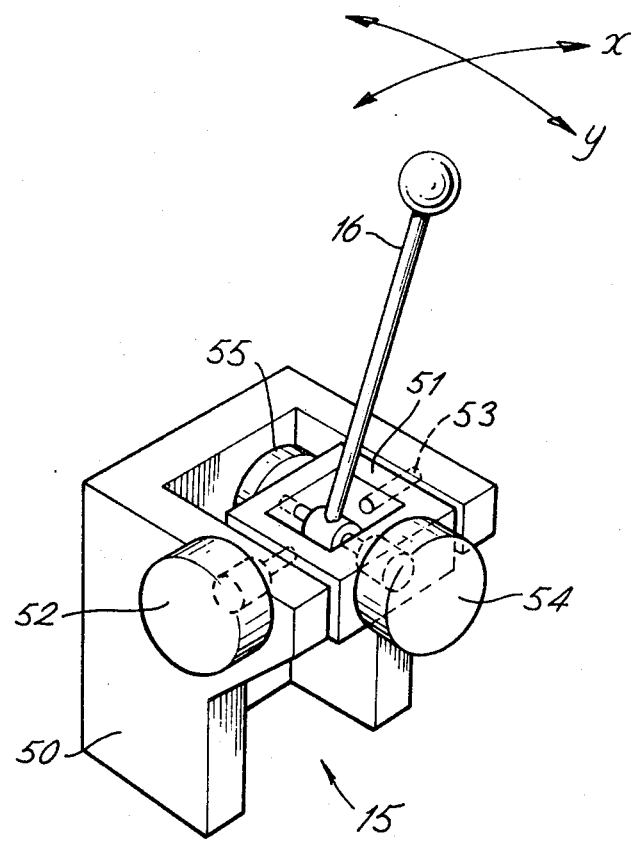
FIG. 2 illustrates a joystick arrangement for controlling the movement of the stepping stage.

Movement of the stepping stage is controlled by a direction control device 15 operated by a joystick 16. The device 15 is illustrated in detail in FIG. 2, and comprises a fixed outer frame 50 and an inner gimbal frame 51. The body of a Y potentiometer 52 is fixed to the outer frame, and the shaft of potentiometer 52 is fixed so as to support one side of the inner frame 51. The opposite side of the inner frame is supported in the outer frame 50 by a bearing pin 53 which, with the potentiometer shaft, allows the inner frame to rotate within the outer frame. The body of an X potentiometer 54 is fixed to the inner frame 51 and the shaft of the X potentiometer, arranged perpendicular to the shaft of the Y potentiometer, is fixed to the lower end of the joystick 16 and to a counterbalance weight 55.

The arrangement is such that movement of the joystick 16 in the x direction causes rotation of the shaft of the X potentiometer with respect to its body, thereby providing an x direction control signal. Movement of the joystick 16 in the y direction causes rotation of the inner frame about the bearing pin and rotation of the shaft of the Y potentiometer with respect to its body, thereby providing a y direction control signal.

The potentiometers 54, 52 are connected respectively to voltage to frequency converters 17, 18 which are connected to the drive circuits 13 and 14. The speed and direction of movement of the stage 10 is a function of the magnitude and direction of movement of the joystick 16; for example, a small movement of the joystick in the x direction causes the stage to move slowly in the x direction, and a large movement of the joystick in the x direction causes the stage to move fast in the x direction.

The voltage to frequency converters 17, 18 are connected respectively through X and Y binary counters 19, 20 to binary squarers 21, 22 which are both connected to a binary adder 23 which feeds a binary number comparator 24. A binary number store 25 supplies a reference number to the comparator 24, and the comparator can reset the counters 19, 20 through a reset generator 26; the generator 26 also supplies the input to a binary counter 27 connected to a binary to analogue converter 28, which is in turn connected to the x direction drive of an x-y recorder 29.

In operation, the control voltages from the direction control device 15 are converted to pulses by the converters 17, 18 the numbers of pulses being respectively proportional to the distance to be travelled by the stage 10 in the x and y directions i.e. each pulse represents a unit displacement. The pulses cause the stage to move, and also provide a measure of the movement. The pulses are counted by the counters 19, 20 and the numbers are squared, then added by the adder 23 to provide, by Pythagoras's theorem, a continually updated value of the square of the length of the hypotenuse to the x and y distances of travel of the stage 10. When the sum of the squares equals or exceeds the number stored in the binary store 25, i.e. when a unit length of hypotenuse has been reached or exceeded, the counters 19, 20 are reset to zero and the binary counter 27 counts 1. The counters 19, 20 then begin counting again until another unit length of hypotenuse is reached, when the counter 27 again adds 1, and so on. If the stage 10 is following a curved path, each hypotenuse will form a unit chord to the curve; if the path is of small curvature compared with the unit chord length the sum of the lengths of the chords will approximately equal the actual length of the curved path, and the output of the binary to analogue converter will provide an approximate measure of the path length, which will be plotted along the x axis of the recorder 29, typically in 60 or 120 micron unit displacements of stage movement, but of course the unit displacement size is variable, as is the distance moved by the recorder corresponding to each displacement.

As explained above, the number in the binary counter 27 increases by 1 when the sum of the squares equals or exceeds the number stored in the binary store. Usually the sum will exceed the stored number so that the "constructed" chord is longer than the required unit length; an error of about 2 or 3% may be introduced. Other factors affecting the accuracy with which a path length is measured are the capacities of the counters 19 and 20 — the higher the bit capacity, the greater the accuracy — and the sharpness of curvature of the path in relation to the size of the steps in which the stepping stage moves.

In this embodiment of the invention, the other variable of the recorder 29 is a measure of the optical density along the path followed by the stage 10, but any other suitable variable can be measured as the curved path is followed. The optical density is measured by providing a red light emitting diode (LED) 30 and detecting the light after transmission through an object under test by a phototransistor 31, the LED and phototransistor both being pulsed in synchronisation by a 1klHZ clock pulse generator 32 connected to a LED drive circuit 33 and a phototransistor signal processor 34, the latter providing the y signal to the x-y recorder 29. The synchronous pulsing provides a satisfactory signal-to-noise ratio without the use of photomultiplier light detector system.

Figure 3:
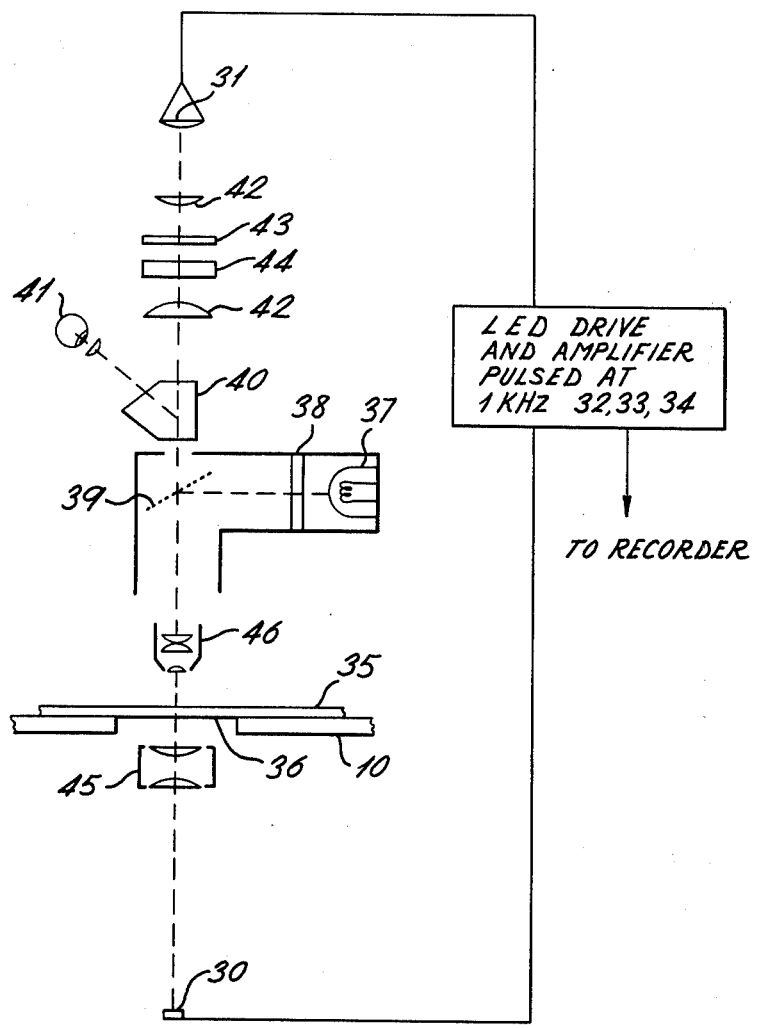
FIG. 3 illustrates the optical arrangement of the microscope when used for making densitometric measurements.

The optical arrangement is illustrated in FIG. 3, in which a photographic plate 35 is placed on the stage 10, which has a central aperture 36.

The plate 35 is illuminated from above by a lamp 37, the light passing through a green filter 38 and being reflected by a half-silvered mirror 39. Above the mirror 39 on the optical axis of the microscope is a beamsplitter 40 which allows observation of the plate 35 by an observer at 41, and above the beamsplitter is a microscope eyepiece lens system 42 containing minus green and minus infra-red filters 43, 44 respectively to remove wavelengths not emitted by the LED, and above the lens system is the phototransistor 31. Below the mirror 39 is a microscope objective lens 46, and below the plate 35 is a condenser lens system 45 and the LED 30.

In use, the LED is focussed by the condenser lens system 45 so as to appear as a red spot in the centre of the field of view, which is green. The observer at 41 operates the joystick 16 (FIG. 1) to move the stage 10 so that the red spot follows a path on the photographic plate 35. The phototransistor 31 provides a measure of the optical density of the plate along the path followed by the red spot, the density being plotted along the y axis of the x-y recorder 29, while the binary to analogue converter 28 provides a measure of the approximate path length which is plotted along the x axis of the recorder.

This arrangement has been used to measure the density profile of early, that is uncontracted and sinuous, metaphase chromosomes; the analysis of the fine band structure was made at a considerably earlier stage than was previously possible. The stage was moved in 0.5 micron steps (unit displacements) and the central red spot was 60 microns in diameter, therefore the relative optical density was measured over a circle 60 microns in diameter. The image scanned was at a magnification of × 1300 It is an advantage of the use of a photographic plate that the magnification (and therefore the sharpness of curvature of a path) and the overall optical density can be chosen before measurements are made. Further, the unit displacements of the chart recorder can be altered so that chromosomes of different degrees of contraction can be matched. It is also possible to provide an optical signal suppressor to remove artefacts such as chromosomes crossing each other.

As stated above, measurements other than optical density can be made and displayed as the Y co-ordinate of the x-y plotter, or the Y co-ordinate may be dispensed with and the apparatus used merely to measure total length along a curved path. Further, the length of a curved path in three dimensions may be measured by providing means for making measurements in three orthogonal directions. It is also possible to measure displacements along two or three axes which are not orthogonal, and to modify the pulse counters appropriately. If required, the measured path length and any other measured variable, such as optical density, may both be supplied to a storage means.

Another possible measurement is the area enclosed by a closed path.

Figure 4:
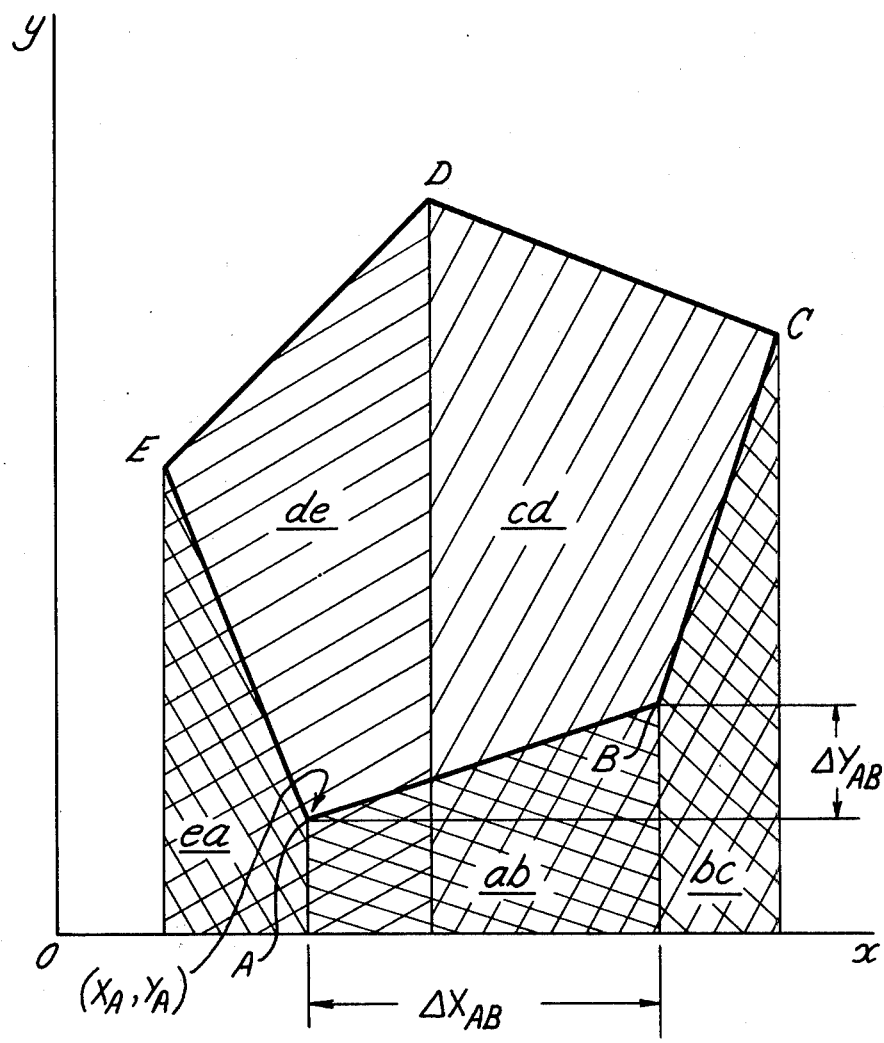
FIG. 4 illustrates a method by which the area enclosed by a planar closed curved path can be calculated.

In FIG. 4, suppose a curved path is approximated by five increments or unit chords AB BC CD DE EA. If perpendiculars to one of two orthogonal axes, e.g. the x axis, are drawn from each point, then five trapesiums are constructed, one under each increment, of areas ab bc cd de ea. The area enclosed by the five increments is:

$$\text{Area of } ABCDE = cd + de - ab - bc - ea \tag{1}$$

If the coordinates of the points ABCDE are represented in terms of X and Y so that $Y_A$ is the coordinate of the point A, and for example the increases in X and Y between points A and B are represented as $\Delta X_{AB}$ and $\Delta Y_{AB}$, then:

$$\text{Area } ab = [Y_A + \Delta Y_{AB}/2]\Delta X_{AB} \tag{2}$$

with corresponding equations for the other four areas.

In FIG. 4 for movement around the closed curve in an anticlockwise direction $\Delta X_{AB}$, $\Delta X_{BC}$ and $\Delta X_{EA}$ are positive and $\Delta X_{CD}$ and $\Delta X_{DE}$ are negative, which gives each area the reverse of its sign in equation (1), although for clockwise rotation the signs are the same as in the equation. Thus when the total area is calculated, the area under each increment must be summed arithmetically, and the total area is the modulus of the arithmetic sum of the individual areas.

Figure 5:
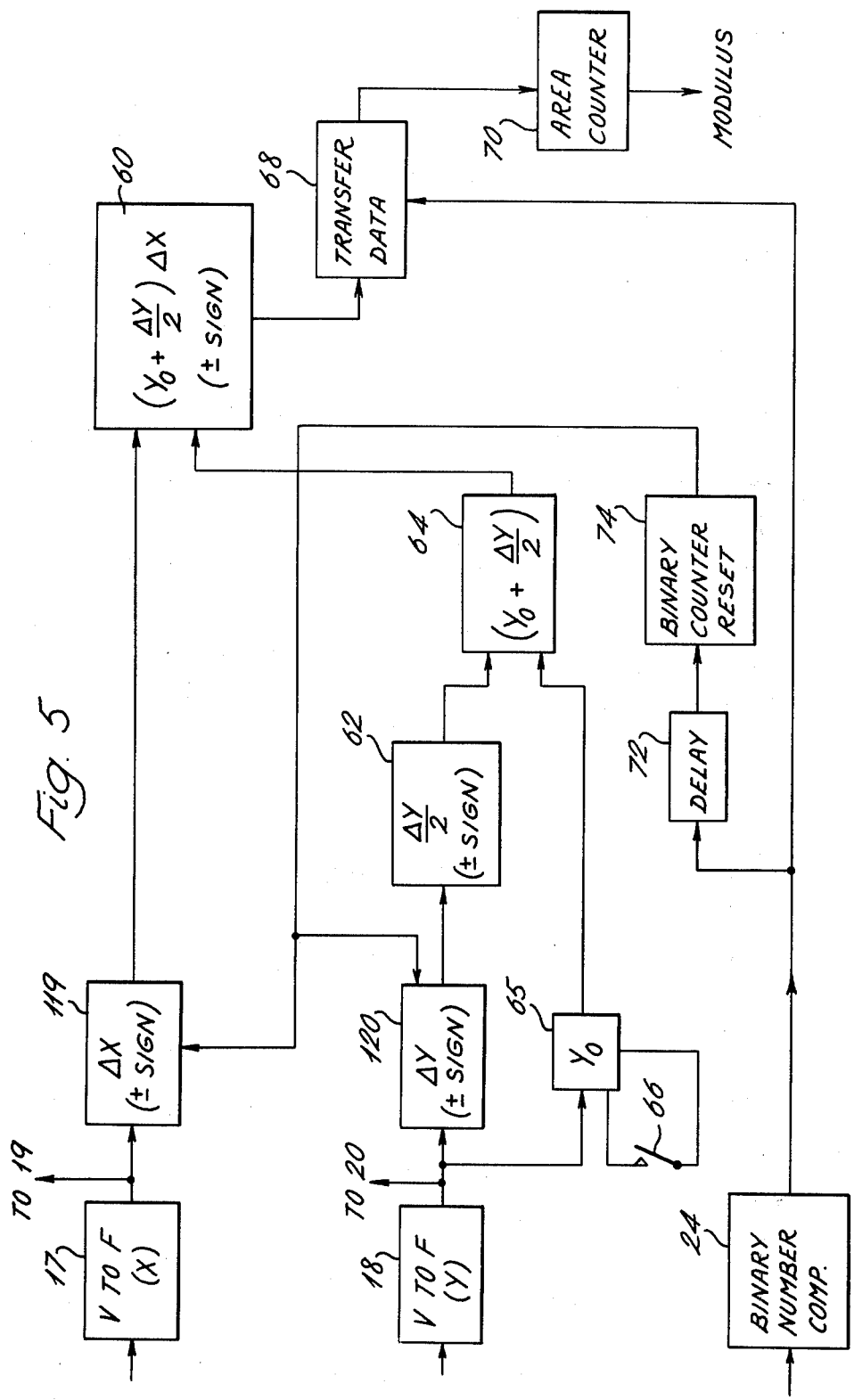
FIG. 5 illustrates schematically the electrical components additional to the system shown in FIG. 1 for making such a measurement of enclosed area.

Apparatus for carrying out the required calculations is shown schematically in FIG. 5 in which additional binary counters 119 and 120 are connected respectively to the voltage to frequency counters 17 and 18, (see FIG. 1). The counters 119 and 120 are identical in size to the counters 19, 20 in FIG. 1, but differ in that the signs of the increases ΔX and ΔY associated with each increment or unit chord are preserved. The ΔX counter 119 is connected directly to a multipler 60. The ΔY counter 120 is connected through a divide-by-two unit 62, which preserves the sign of the divided value, to an adder 64 which is also connected through a counter 65 to the voltage to frequency converter 18; the counter 65 determines a value $Y_o$ representing the position in the y direction of the beginning of each increment. If the position of point E is taken as the origin in the measurement of area by use of a set zero switch 66, the size of this counter can be reduced.

The adder 64 is connected to the multiplier 60, the output of which is connected through a data transfer unit 68 to a area counter 70.

The binary number comparator 24 shown in FIG. 1 is connected directly to the data transfer unit 68 and through a delay device 72 and a binary counter reset 74 to the binary counters 119 and 120.

In operation, while the counters 19 and 20 in FIG. 1 count pulses from the X and Y drive motors, the counters 119 and 120 count these pulses but preserve the net incremental sign. The multiplier 60 calculates $[Y_o + \Delta Y/2]\Delta X$ when the end of a unit chord or increment is reached; the number in the multiplier 60 equals the area under that increment. When the binary number comparator 24 in FIG. 1 provides an output signal as a unit chord is reached, the data transfer unit causes the area counter 70 to increase its stored number by the number in the multiplier 60. This transfer must take place before the counters 119 and 120 are reset, therefore the signal from comparator 24 is delayed by delay unit 72 before it causes the reset 74 to operate and return the counters 119, 120 to zero.

When the starting point of the movement is reached once more to provide a closed path, the modulus of the number in the area counter gives a measure of the area enclosed by the path, in units of (unit displacement)$^2$.

While the measurement has been described by operating on the x axis, it can equally well be made using perpendiculars to the y axis in FIG. 4 with appropriate modifications to the counting circuitry.

We claim:

1. A device for determining the planar area within a closed curved path, comprising:
   means movable along said path;
   means connected to said movable means for simultaneously measuring respective components of movement of the movable means in two orthogonal directions in the plane as said movable means travels along the path;
   means responsive to outputs from said measuring means representative of the respective measured components of movement for calculating the length of the hypotenuse of a right triangle, the other two sides of said triangle being defined by said components of movement;
   means connected to the calculating means for continuously comparing the calculated value of length with a predetermined value;
   means joined to said comparing means and operative upon occurrence of equality of the compared values for indicating that the movable means has traveled a distance defined by a unit hypotenuse;
   means for locating, with respect to the two orthogonal directions, each of said unit hypotenuses traveled by the movable means;
   means for determining each of the areas bounded by a unit hypotenuse, one orthogonal direction and perpendiculars to that direction from the ends of the hypotenuse, each area having associated with it an arithmetical sign related to the general direction of movement of the movable means along said one orthogonal direction during production of that hypotenuse; and
   means to determine the modulus of the arithmetical sum of the areas.

2. A device according to claim 1, wherein said means connected to said movable means comprises:
   sensing means for translating components of movement in each orthogonal direction into pulses, each pulse being representative of a unit displacement in the respective orthogonal direction; and counting means for separately counting the number of pulses associated with each orthogonal direction of movement;
   wherein said means responsive to outputs from said measuring means comprises:
   squaring means connected to the counting means for squaring the pulse count associated with each orthogonal direction of movement; and means joined to the squaring means to sum the squared pulse counts until a sum is reached which corresponds to that of said unit hypotenuse;
   and wherein said device further comprises:
   additional counting means for counting the number of unit hypotenuses and for distinguishing by an arithmetical sign the direction with respect to each orthogonal axis of each unit hypotenuse; additional calculating means connected to the additional counting means and operative to calculate the area between each unit hypotenuse and one orthogonal direction by dividing by two the sum of the displacements in the other orthogonal direction associated with that unit hypotenuse, adding to the divided number the number of displacements representing the coordinate of the origin of the unit hypotenuse in said other orthogonal direction, and multiplying the sum by the arithmetical sum of the displacements in said one orthogonal direction associated with that unit hypotenuse; and adding means connected to the additional calculating means to arithmetically sum the calculated areas and provide an output signal related to the modulus of the arithmetic sum.

* * * * *